July 12, 1960
G. V. KULLGREN ET AL
2,944,286
EXTRUSION SCREW ADJUSTING MECHANISM
Filed Oct. 14, 1958
2 Sheets-Sheet 1
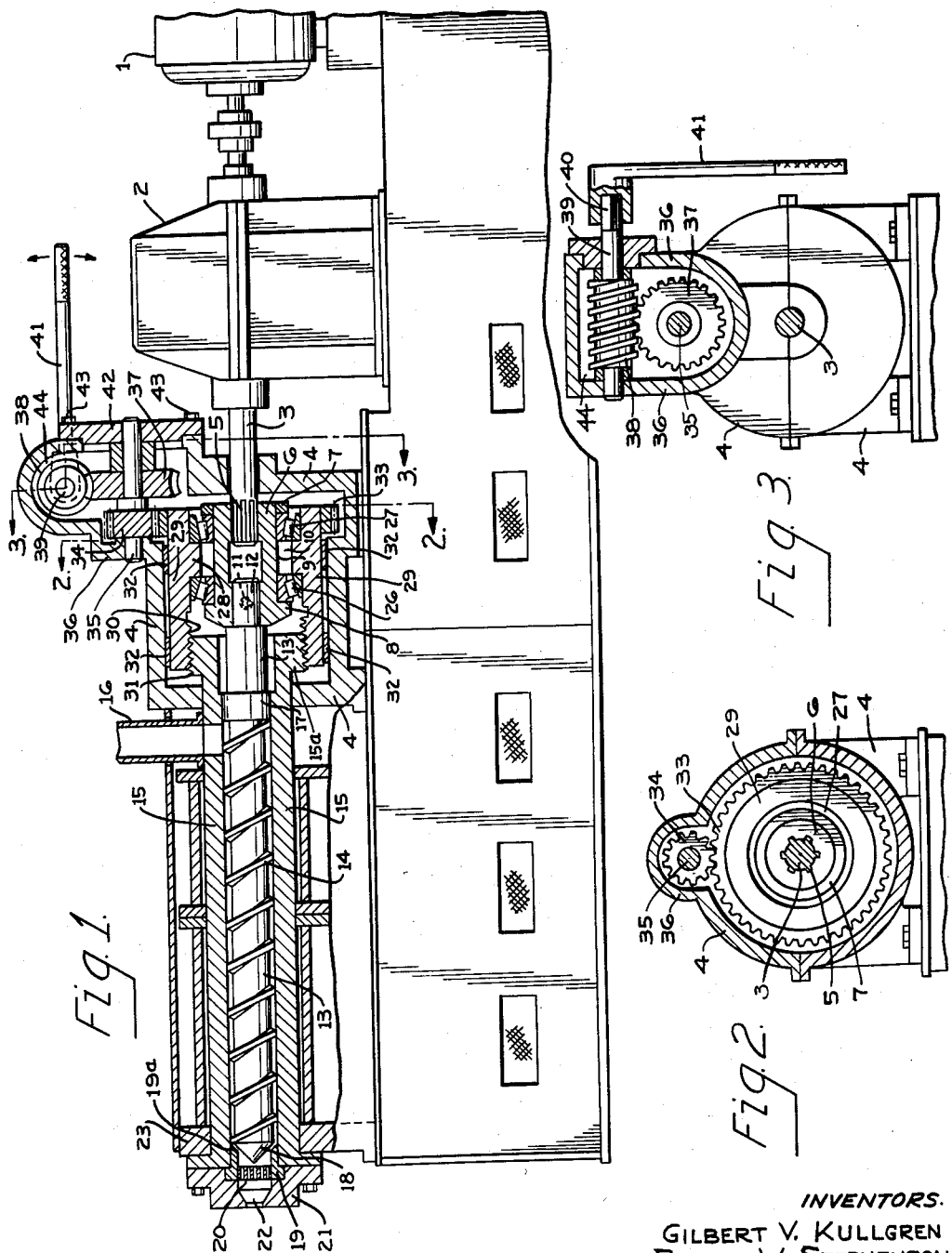
INVENTORS.
GILBERT V. KULLGREN
DANIEL W. STEPHENSON
ATTORNEYS.

July 12, 1960  G. V. KULLGREN ET AL  2,944,286
EXTRUSION SCREW ADJUSTING MECHANISM
Filed Oct. 14, 1958  2 Sheets-Sheet 2
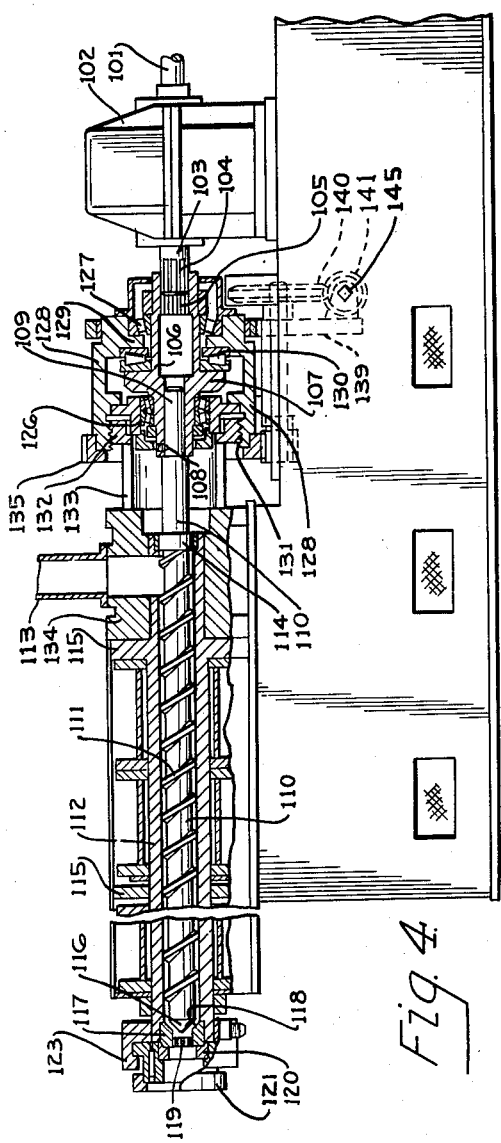
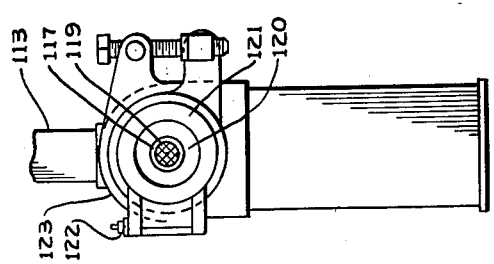
INVENTORS.
GILBERT V. KULLGREN
DANIEL W. STEPHENSON
ATTORNEYS.

United States Patent Office 2,944,286
Patented July 12, 1960

2,944,286

EXTRUSION SCREW ADJUSTING MECHANISM

Gilbert V. Kullgren and Daniel W. Stephenson, Akron, Ohio, assignors, by mesne assignments, to Blaw-Knox Company, Pittsburgh, Pa., a corporation of Delaware Filed Oct. 14, 1958, Ser. No. 767,145

6 Claims. (Cl. 18—12)

This invention relates to extrusion presses, and particularly to high-pressure extrusion presses for plastics and the like of a kind in which the material is extruded by means of an extrusion screw that rotates within a cylinder or extrusion barrel.

In extrusion presses generally, it is desirable that the relationship between the extrusion screw and the orifice at the end of the screw be adjustable to compensate for wear, to allow for variations in physical characteristics of the different materials likely to be extruded, and to permit the operator to arrive at optimum conditions of operation for any given type of material. In particular, by such adjustment it is possible to control the back pressure developed in the material being extruded. Provision for making such adjustment when the machine is not operating is known in conventional extruders operating at moderate pressures. However, if the operating pressure is increased, leakage difficulties are encountered.

The present invention has for one of its objects to provide a high-pressure extrusion press in which the size of the orifice at the end of the extrusion screw can be varied by longitudinal adjustment of the screw and in which seals may be largely or entirely omitted, particularly in those locations in which they would otherwise be required as a result of the fact that the extrusion screw is axially adjustable in relation to the extrusion barrel. Another object is the provision of a relatively simple mechanism for adjusting the position of the extrusion screw, by means of which the orifice at the end of the screw may be adjusted with a high degree of precision while the machine is operating.

A further object of the invention is to provide a thrust bearing which, together with the extrusion screw, is bodily movable in relation to the extrusion barrel. This end the invention attains by locating the bearing assembly or assemblies within a sleeve-like locating member of massive construction that is in threaded engagement with the inboard end of the extrusion barrel. The adjusting mechanism operates directly on this sleeve-like locating member, thus permitting simultaneous movement of the sleeve-like member, the bearings associated with it, and the components connecting the bearings to the inboard end of the extrusion screw.

The invention has as a further object the provision of an adjusting mechanism that is simple, study and readily accessible to the operator. This object the invention accomplishes, for example, by interposing a ring gear and a coacting pinion between the adjusting mechanism and the previously mentioned sleeve-like locating member, whereby the manipulative force exerted by the operator on the adjusting mechanism is transmitted by the pinion and ring gear to the sleeve-like member, thence to the bearing assembly or assemblies, and thence to the proximate end of the extrusion screw. Notwithstanding the fact that the machine may be designed for continuous operation in the high-pressure range, this arrangement permits of the use of simple, sturdy components requiring a minimum of attention.

Other objects, advantages and features of the invention will be apparent from the description which follows and from the accompanying drawings, in which:

Figure 1 is a longitudinal section with parts in elevation through an extrusion press ("extruder") in which the invention is incorporated.

Figure 2 is a transverse section on line 2—2 of Figure 1.

Figure 3 is a similar section on line 3—3 of Figure 1.

Figure 4 is a longitudinal section through a modified form of the extrusion press of Figure 1.

Figure 5 is an end elevation viewed from the left in Figure 4.

Figure 6 is an enlargement of part of Figure 4 showing additional details.

Figure 7 is an elevation on line 7—7 of Figure 6.

The extrusion press of Figures 1 to 3 includes an electric motor 1 to which, through suitable shafting, is connected a series of speed reduction gears (not shown) in gear box 2. Drive shaft 3 on the output side of gear box 2 passes through an opening in the end wall of housing 4 which, in common with motor 1 and gear box 2, is mounted on the base of the machine. That portion of drive shaft 3 which extends inwardly beyond the wall of housing 4 is splined as indicated at 5.

A thrust sleeve 6, formed and arranged as shown in Figure 1, is provided at one end with a splined opening accommodating the splined end 5 of drive shaft 3. Thus thrust sleeve 6 can be moved axially of drive shaft 3 notwithstanding the fact that the splines require the two to rotate together. At the end of thrust sleeve 6 in which drive shaft 3 is received is a removable collar 7. At the opposite end is an integral collar 8. Between the two is a cylindrical surface 9 on which, as will appear, are located two opposed anti-friction bearing assemblies that are separated from each other by space 10.

Thrust sleeve 6 is fastened by suitable means such as a screw 11 to the trailing end 12 of extrusion screw 13. The latter is formed with a helical rib 14 that fits closely within the elongated chamber in extrusion barrel 15. The material to be extruded is admitted to such chamber through tube 16, which in a typical case may constitute the lower end of a hopper (not shown). Immediately to the rear of tube 16 extrusion screw 13 is provided with an integral collar 17 that fits closely within the extrusion barrel. Collar 17 substantially prevents leakage at the trailing end of extrusion screw 13.

The leading end of extrusion screw 13 is provided with a conical valve point 18 adapted to co-act with a valve seat 19 provided as shown with a frusto-conical end face 19a. The angle of taper of the latter is such as to conform to the angle of taper of valve point 18. Holding valve seat 19 and breaker plate 20 securely in position is an end plate 21 provided with an orifice 22. An upright 23 mounted on the base of the extrusion press supports these and other parts making up the outboard end of extrusion barrel 13.

Up to this point, the extrusion press has been described as if it included no adjusting means for moving extrusion screw 13 axially of extrusion barrel 15. In practice, however, adjusting means are desirable in order to compensate for wear and to permit the operator to increase or decrease the annular space that separates valve seat 19 and valve point 18 on extrusion screw 13. The longitudinal spacing between the leading end of the screw and frusto-conical surface 19a of valve seat 19 determines the size of the orifice through which the material being extruded must flow: by proper control of this orifice, the desired back pressure can be developed. Adjustment is virtually a necessity if the extruder is to accommodate materials of widely different flow characteristics or materials having different characteristics at different temperatures. At the same time, the adjusting means must be such that axial displacement of the extrusion screw within the extrusion barrel will not come about inadvertently.

Thrust sleeve 6 supports the inner races of the two opposed anti-friction bearing assemblies 26 and 27. The two bearing assemblies are spaced from each other by an inwardly directed annular flange 28 forming part of a nut-like locating sleeve 29 that supports their outer races. This sleeve is internally threaded as at 30 and is mounted upon an externally threaded portion 31 on an enlargement 15a at the inboard end of extrusion barrel 15. Guide bushings 32 intervene between locating sleeve 29 and housing 4. Inasmuch as extrusion barrel 15 is affixed to housing 4 and/or to upright 23, rotary movement of locating sleeve 29 brings about axial displacement of sleeve 29 relative to extrusion barrel 15.

To bring about this rotary movement, locating sleeve 29 is provided with a ring gear 33 fixedly mounted thereon outwardly of anti-friction bearing assembly 27. Cooperating with ring gear 33 is a pinion 34 fixedly mounted on a shaft 35 journalled in an extension 36 on housing 4. Within housing extension 36 are a worm wheel 37 likewise rigidly mounted on shaft 35 and a cooperating worm 38 rigidly mounted on a worm shaft 39. The latter has an outwardly projecting portion 40 which may be provided with flats for coaction with a socket wrench 41, as shown, but to which a motor or other powering device may be coupled, if desired. An access plate 42 held in place by bolts 43 permits access to the parts in chamber 44 in housing extension 36.

To make a needed adjustment of extrusion screw 13, the operator simply actuates the powering device, if there is one, or moves the outer end of socket wrench 41 upward or downward. This produces a corresponding degree of rotary movement in worm shaft 39, worm 38 and worm wheel 37. Communicated through shaft 35 to pinion 34, this produces rotational movement of ring gear 33 and of locating sleeve 29. Rotational movement of locating sleeve 29 brings about axial displacement of thrust sleeve 6 and extrusion screw 13 relative to extrusion barrel 15, thus increasing or decreasing the clearance between valve point 18 and valve seat 19.

Thus a simple, sturdy mechanism is provided for moving extrusion screw 13, such mechanism involving only a few parts which collectively present no particular problems from the standpoint of maintenance. The principal components of the adjusting mechanism require a minimum amount of space in the apparatus and most of them are so arranged in relation to the rest of the apparatus, as in a separate chamber, that they are readily accessible. The necessity for using seals to prevent leakage is largely or entirely obviated, thus eliminating a fruitful source of trouble in prior extrusion presses incorporating adjustable extrusion screws.

In the modified form of extrusion press illustrated in Figures 4 to 7, shafting 101 from a suitable electric motor (not shown) is connected to a series of speed reduction gears in gear box 102. On the output side of gear box 102 is drive shaft 103, the projecting end of which is splined as at 104. The splined portion of shaft 103 is slidably engaged with a correspondingly splined portion 105 in a thrust sleeve 106 provided with a radially extending flange 107, the purpose of which will appear hereinafter. Thrust sleeve 106 is rigidly affixed as by a screw 108 to the inboard end 109 of extrusion screw 110.

Extrusion screw 110 is formed as indicated in Figure 4 with a helical rib 111 that fits closely within the chamber in extrusion barrel 112. The material to be extruded is admitted through tube 113, which typically may constitute the lower end of a hopper. To the rear of tube 113 extrusion screw 110 is provided with a journalled collar 114 that fits closely within extrusion barrel 112: this collar largely prevents leakage at the trailing end of extrusion screw 110. Extrusion barrel 112 is mounted on the bed of the machine by means of uprights 115.

The leading end of extrusion screw 110 is provided with a conical valve point 116 adapted to cooperate with a valve seat 117. The latter is provided with a rearwardly facing frusto-conical seating surface 118 conforming in shape to the shape of the pointed end of extrusion screw 110. Holding valve seat 117, breaker plate 119 and extrusion die 120 in place is an end plate 121 that is pivoted at 122 to a removably mounted head 123 on the outboard end of extrusion barrel 112.

From the foregoing it will be apparent that the manner of operation of the modified form of extrusion press shown in Figures 4 to 7 is the same as that of the extrusion press shown in Figures 1 to 3.

Referring now to Figure 6, thrust sleeve 106 turns within two roller bearing assemblies 126 and 127 that are held in place as shown in a locating sleeve 128, which, since there is no separate housing, may also be referred to as a housing sleeve. Bearing assemblies 126 and 127 are separated from each other by the previously mentioned flange 107 on thrust sleeve 106, by an inwardly directed annular flange 129 on locating sleeve 128, and by a radially mounted roller bearing assembly 130. Collectively, bearing assemblies 127, 128 and 130 and the parts therewith associated form a particularly efficient thrust bearing. Locating sleeve 128 is internally threaded as at 131 for coaction with an externally threaded flange 132 that is rigidly connected by two oppositely facing half-sleeves 133 to a massive casting 134 on the inboard end of extrusion barrel 112.

Locating sleeve 128 is provided with a ring gear 135 fixedly mounted thereon outwardly of threaded portion 131. Cooperating with ring gear 135 is a pinion 136 keyed to a shaft 137 that is supported in brackets 138 and 139 as illustrated in Figure 6. A worm wheel 140 keyed to shaft 137 coacts with a worm 141 rigidly mounted on a worm shaft 142 supported by ears 143, 144 on bracket 139. Worm shaft 142 has an end portion 145 for reception in a suitably shaped socket in the head 146 of a wrench 147. A motor or other powering device may be used in lieu of wrench 147, if desired.

To adjust extrusion screw 110, the operator raises or lowers the handle of wrench 147 as required to produce the intended result. Rotation of worm shaft 142, worm 141 and worm wheel 140 is communicated through shaft 137 to pinion 136 and ring gear 135. Rotation of locating sleeve 128 results in its axial displacement relative to extrusion barrel 112. Through the intervention of thrust sleeve 106, to which this displacement is communicated, extrusion screw 110 is moved toward or away from valve seat 117, depending on the direction of movement of wrench 147.

Like the embodiment of the invention illustrated in Figures 1 to 3, which it resembles, the modification shown in Figures 4 to 7 has the advantage of simplicity, sturdiness and ease of accessibility. In each case the invention provides an arrangement that permits the operator to adjust the extrusion screw without difficulty not only when the extrusion press is idle but also when it is in actual operation under full load. Changes may be expected of those skilled in the art, particularly in respect of the mechanism at the inboard end of the extrusion press.

It is intended that the patent shall cover, by summarization in appended claims, all features of patentable novelty residing in the invention.

We claim:

1. In an extrusion press, supporting structure, an extrusion barrel carried by the supporting structure and having a bore, an extrusion screw within the bore of the extrusion barrel, a separately formed thrust sleeve fixed to and in driving engagement with the inboard end of the screw, a drive shaft concentric with and splined to the thrust sleeve for exerting on the thrust sleeve the power required for turning the screw, a thrust bearing rotatably supporting the thrust sleeve, a locating sleeve supporting the bearing, said locating sleeve having threaded engagement with a threaded portion that is fixed with respect to the inboard end of the extrusion barrel and spaced from the bore of the extrusion barrel, and means including reduction gearing for rotating the locating sleeve while the press is in operation, thereby simultaneously moving the locating sleeve, thrust bearing, thrust sleeve and extrusion screw longitudinally relative to the extrusion barrel and to the drive shaft.

2. An extrusion press according to claim 1 wherein the locating sleeve is in threaded engagement with a separately formed member that is rigidly connected to the extrusion barrel.

3. An extrusion press according to claim 1 wherein the locating sleeve is in threaded engagement with external threads on the inboard end of the extrusion barrel.

4. An extrusion press according to claim 1 in which the reduction gearing comprises a gear attached to the locating sleeve, a pinion engaging the gear and manually operated means for rotating the pinion.

5. In an extrusion press, supporting structure, an extrusion barrel carried by the supporting structure and having a bore, an extrusion screw within the bore of the extrusion barrel, a separately formed thrust sleeve fixed to and in driving engagement with the inboard end of the extrusion screw, means for driving the thrust sleeve while permitting longitudinal movement thereof, a locating sleeve having threaded engagement with a threaded portion that is fixed with respect to the inboard end of the extrusion barrel and spaced from the bore of the extrusion barrel, anti-friction thrust bearing means carried by the locating sleeve and supporting the thrust sleeve, and means for rotating the locating sleeve while the press is operating thereby simultaneously moving the locating sleeve, bearing means, thrust sleeve and extrusion screw longitudinally relative to the extrusion barrel.

6. In an extrusion press, supporting structure, an exarusion barrel carried by the supporting structure, an extrusion screw within the extrusion barrel, a separately formed thrust sleeve fixed to and in driving engagement with the inboard end of the extrusion screw, means for driving the thrust sleeve while permitting longitudinal movement thereof, a locating sleeve having internal threads in threaded engagement with external threads on the inboard end of the extrusion barrel, anti-friction thrust bearing means carried by the locating sleeve and supporting the thrust sleeve, and means for rotating the locating sleeve while the press is operating thereby simultaneously moving the locating sleeve bearing means, thrust sleeve and extrusion screw longitudinally relative to the extrusion barrel.

References Cited in the file of this patent

UNITED STATES PATENTS

| 2,449,652 | Heston | Sept. 21, 1948 |
| 2,629,132 | Willcox et al. | Feb. 24, 1953 |
| 2,810,159 | Teichmann | Oct. 22, 1957 |